United States Patent
Mosko et al.

(10) Patent No.: US 9,516,144 B2
(45) Date of Patent: Dec. 6, 2016

(54) CUT-THROUGH FORWARDING OF CCNX MESSAGE FRAGMENTS WITH IP ENCAPSULATION

(71) Applicant: Palo Alto Research Center Incorporated, Palo Alto, CA (US)

(72) Inventors: Marc E. Mosko, Santa Cruz, CA (US); Ignacio Solis, South San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 257 days.

(21) Appl. No.: 14/309,681

(22) Filed: Jun. 19, 2014

(65) Prior Publication Data

US 2015/0373162 A1 Dec. 24, 2015

(51) Int. Cl.
| | |
|---|---|
| H04L 29/06 | (2006.01) |
| H04L 12/741 | (2013.01) |
| H04L 12/721 | (2013.01) |
| H04L 29/08 | (2006.01) |
| H04L 12/805 | (2013.01) |

(52) U.S. Cl.
CPC .............. *H04L 69/22* (2013.01); *H04L 45/40* (2013.01); *H04L 47/36* (2013.01); *H04L 67/327* (2013.01)

(58) Field of Classification Search
None
See application file for complete search history.

(56) References Cited

U.S. PATENT DOCUMENTS

| | | | |
|---|---|---|---|
| 817,441 | A | 4/1906 | Niesz |
| 4,309,569 | A | 1/1982 | Merkle |
| 4,921,898 | A | 5/1990 | Lenney |
| 5,070,134 | A | 12/1991 | Oyamada |
| 5,110,856 | A | 5/1992 | Oyamada |
| 5,506,844 | A | 4/1996 | Rao |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Jacobson, Van et al. 'VoCCN: Voice Over Content-Centric Networks.' Dec. 1, 2009. ACM ReArch'09.

(Continued)

*Primary Examiner* — Candal Elpenord
(74) *Attorney, Agent, or Firm* — Shun Yao; Park, Vaughan, Fleming & Dowler LLP

(57) ABSTRACT

One embodiment provides a system that facilitates cut-through forwarding of message fragments over a network. During operation, the system receives a packet that corresponds to a fragment of a message and contains a fragment header. The system stores in a data structure a mapping relationship between the fragment header and a hierarchically structured variable-length identifier (HSVLI), wherein the HSVLI comprises contiguous name components ordered from a most general level to a most specific level. The system makes a forwarding decision for the packet based on the fragment header prior to receiving all fragment packets associated with the message, thereby facilitating cut-through forwarding of the message fragments over a network.

18 Claims, 8 Drawing Sheets

(56) References Cited

U.S. PATENT DOCUMENTS

| | | |
|---|---|---|
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 9,137,152 B2 * | 9/2015 | Xie .................. H04L 45/44 |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |

(56) References Cited

U.S. PATENT DOCUMENTS

| | | |
|---|---|---|
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1* | 12/2010 | Thathapudi ............ H04L 47/10 370/395.1 |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0280214 A1* | 11/2011 | Lee .................... H04W 36/023 370/331 |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1* | 5/2012 | Lee .................... H04L 67/2838 709/206 |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |

(56) References Cited

U.S. PATENT DOCUMENTS

| | | |
|---|---|---|
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1* | 6/2013 | Westphal ............... H04L 67/06 709/202 |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0181140 A1* | 6/2014 | Kim ......................... H04L 67/06 707/769 |
| 2014/0192717 A1 | 7/2014 | Liu |
| 2014/0195328 A1 | 7/2014 | Ferens |
| 2014/0195666 A1 | 7/2014 | Dumitriu |
| 2014/0204945 A1* | 7/2014 | Byun ....................... H04L 45/74 370/392 |
| 2014/0233575 A1 | 8/2014 | Xie |
| 2014/0237085 A1* | 8/2014 | Park ......................... G06Q 50/10 709/219 |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

Rosenberg, J. "Interactive Connectivity Establishment (ICE): A Protocol for Network Address Translator (NAT) Traversal for Offer/Answer Protocols", Apr. 2010, pp. 1-117.

Shih, Eugene et al., 'Wake on Wireless: An Event Driven Energy Saving Strategy for Battery Operated Devices', Sep. 23, 2002, pp. 160-171.

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (PURSUIT)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

(56) References Cited

OTHER PUBLICATIONS

B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, 'Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim Hj Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Acevess, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext—policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA—Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.

(56) References Cited

OTHER PUBLICATIONS

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.

(56) References Cited

OTHER PUBLICATIONS

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al., "DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network$.
D. Trossen and G. Parisis, "Designing and realizing and information-centric internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
lshiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hogue et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.

\* cited by examiner

CUT-THROUGH FORWARDING OF CCNX MESSAGE FRAGMENTS WITH IP ENCAPSULATION

BACKGROUND

Field

This disclosure is generally related to efficient communication over a data network. More specifically, this disclosure is related to cut-through forwarding of CCN message fragments using IP encapsulation.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients, forwarders (e.g., routers), and content producers, which communicate with each other by sending "interest" packets for various content items and receiving "content object" packets in return. CCN interests and content objects are identified by their unique names, which are typically hierarchically structured variable length identifiers (HSVLI). Generally, interests and content objects travel through a number of links before they can reach their destination. Each link can have its own maximum transmission unit (MTU), where the differing MTU limits impose different fragmentation requirements. End-to-end CCN fragmentation is described in the following applications:

U.S. patent application Ser. No. 14/065,691, entitled "SYSTEM AND METHOD FOR HASH-BASED FORWARDING OF PACKETS WITH HIERARCHICALLY STRUCTURED VARIABLE-LENGTH IDENTIFIERS," by inventors Marc E. Mosko and Michael F. Plass, filed 28 Oct. 2013 (hereinafter "U.S. patent application Ser. No. 14/065,691"); and U.S. patent application Ser. No. 14/067,587, entitled "SYSTEM AND METHOD FOR MINIMUM PATH MTU DISCOVERY IN CONTENT CENTRIC NETWORKS," by inventor Marc E. Mosko, filed 30 Oct. 2013 (hereinafter "U.S. patent application Ser. No. 14/067,587");

the disclosures of which are herein incorporated by reference in their entirety.

In a heterogeneous network comprised of both CCN and Internet Protocol (IP) nodes or forwarding devices such as routers, a piece of CCN content (requested in an interest or received in a content object) may be larger than the maximum transmission unit (MTU) of the network. One solution is to use IP at the network layer and rely on IP fragmentation. A CCN message (interest or content object) can be carried as the IP payload and fragmented by currently known IP fragmentation methods as it travels hop by hop to the next CCN router. The CCN nodes can rely on a standard IPv4 or IPv6 protocol stack to reassemble the fragments at each CCN hop. However, this solution introduces delay because the CCN router needs to wait for all the IP fragments to arrive in order to reassemble the entire CCN message and determine the next CCN hop. Furthermore, this solution introduces additional delay because upon reassembly, the IP packet may need to be re-fragmented for subsequent travel across the network.

SUMMARY

One embodiment provides a system that facilitates cut-through forwarding of message fragments over a network.

During operation, the system receives a packet that corresponds to a fragment of a message and contains a fragment header. The system stores in a data structure a mapping relationship between the fragment header and a hierarchically structured variable-length identifier (HSVLI), wherein the HSVLI comprises contiguous name components ordered from a most general level to a most specific level. The system makes a forwarding decision for the packet based on the fragment header prior to receiving all fragment packets associated with the message, thereby facilitating cut-through forwarding of the message fragments over a network.

In some embodiments, the fragment header includes: a flow identifier that indicates that the fragment corresponds to the message; a fragment count that indicates a total number of fragments which correspond to the message; and a fragment number that indicates the index of the fragment.

In some embodiments, the data structure further comprises a fragment stream identifier which corresponds to a tuple that includes an Internet Protocol (IP) source address, an IP destination address, a protocol field that indicates a higher-layer protocol carried in an IP packet, and a flow identifier that indicates that the fragment corresponds to the message.

In some embodiments, the system maintains a pending interest table (PIT), where a respective entry in the PIT indicates a pending interest, the flow identifier, a hierarchically structured variable-length identifier (HSVLI) that identifies the interest and corresponds to the flow identifier, and a fragment bitmap that indicates a number of corresponding content fragments that have been provided for the interest.

In some embodiments, the system encapsulates the packet using an outer IP header to transmit the packet across a mixed network, where the mixed network is comprised of nodes associated with one or more of: a content centric network (CCN); a network running a version four of IP; and a network running a version six of IP, thereby facilitating cut-through forwarding of the message fragments using IP encapsulation over the network.

In some embodiments, the packet contains a content object in response to an interest in the content, where the size of the packet containing the content object is equal in size to or smaller than the largest fragment corresponding to an interest in the content, based on the same flow identifier in the fragment header.

In some embodiments, the system determines, by a requesting node, a maximum transmission unit (MTU) of a network. The system fragments a message into one or more packets, where the size of each packet is less than or equal to the MTU of the network. The system generates a fragment header which identifies the one or more packets as corresponding to the message.

In some embodiments, the system generates a flow identifier which corresponds to an HSVLI of the message. Furthermore, the fragment header includes the flow identifier, a fragment count that indicates the total number of fragments which correspond to the message, and a fragment number that indicates the index of the fragment.

BRIEF DESCRIPTION OF THE FIGURES

In the figures, like reference numerals refer to the same figure elements.

DETAILED DESCRIPTION

Figure 1:
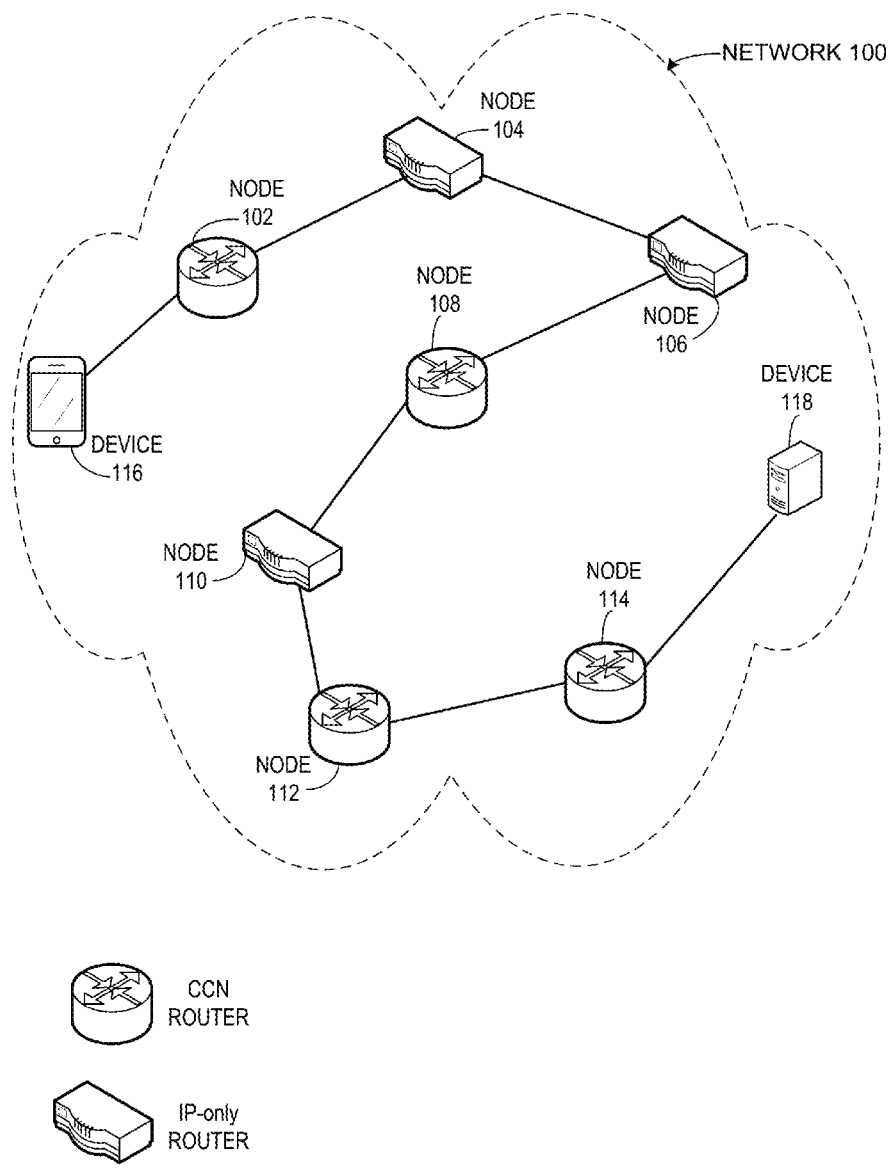
FIG. 1 illustrates an exemplary network facilitating cut-through forwarding of CCN message fragments over a network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system which facilitates cut-through forwarding of CCN message fragments using IP encapsulation in a heterogeneous network comprised of both CCN and IP nodes. In such a network, when a CCN interest or content object message is larger than the maximum transmission unit (MTU) of the underlying network, the network provides the fragmentation services, e.g., IP fragmentation. The CCN message is carried as the payload in an IP packet, which is then fragmented using IP fragmentation, and sent from the requesting CCN node to the CCN node at the destination IP address. The receiving CCN node can use a standard IPv4 or IPv6 protocol stack to reassemble the fragments at each CCN hop. However, this method incurs delay because: 1) the CCN node needs to wait for all of the IP packet fragments to arrive in order to reassemble the CCN message and determine the next CCN hop; and 2) upon reassembly, the CCN message may need to be re-fragmented for subsequent transmission across the network.

The present invention solves the problem of delay and inefficiency due to reassembly and re-fragmentation by pre-fragmenting the CCN message into fragments that are the same size as or smaller than the MTU of the underlying network and including a fragment header in the payload of each message fragment. The fragment header identifies the fragment as belonging to the CCN message. During operation, a CCN node sends a first fragment associated with a CCN message which can be a CCN interest or content object, which contains the HSVLI that uniquely identifies a piece of content, along with the fragment header. Subsequent fragments sent by the CCN node contain portions of the same CCN message and the appropriate fragment header, which indicates a flow identifier corresponding to the CCN message, a total fragment count, and an index number. The fragments are passed to the IP layer and encapsulated with the appropriate IP header.

An intermediate CCN node receives the first fragment, maps the flow identifier to the HSVLI, updates its Pending Interest Table (PIT), and forwards the fragment to the next CCN hop in the CCN data path by passing the fragment back to the IP layer. When this intermediate CCN node receives subsequent fragments of the same CCN message, it simply checks the flow identifier and forwards the fragment to the next CCN hop in the same manner as the first fragment without having to wait for all fragments belonging the same CCN message to be received before making a forwarding decision. This system thus facilitates cut-through forwarding of CCN message fragments with underlying IP encapsulation.

The following terms describe elements of a CCN architecture:

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names: A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

Exemplary Network and Communication

FIG. 1 illustrates an exemplary network 100 that facilitates cut-through forwarding of CCN message fragments over a network, in accordance with an embodiment of the present invention. Network 100 can include a client device 116, a content producing device 118, and a router or other forwarding device at nodes 102, 104, 106, 108, 110, 112, and 114. Network 100 can be a heterogeneous network, where each of nodes 102-114 can be a CCN router or an IP-only router. For example, nodes 102, 108, 112, and 114 can be CCN routers, while nodes 104, 106, and 110 can be IP-only routers. A CCN router can be a CCN forwarding device residing on top of an IP router. In other words, CCN can be implemented as an overlay on top of IP. Other CCN overlay architecture is also possible. A node can be a computer system, an end-point representing users, and/or a device that can generate interests or originate content. For example, requesting CCN node 102 can generate an interest in a piece of content; intermediate CCN routers 108 and 112 can receive and forward message fragments; and CCN content producer 114 can satisfy the requested interest. Node 102 can generate an interest in a piece of content, pre-fragment the interest message, add a fragment header to each fragment, and forward the interest fragments to intermediate CCN router 108. CCN router 108 can determine whether a fragment header indicates a mapping relation between the flow identifier and an HSVLI. If a mapping exists, CCN router 108 forwards the message fragment to the next CCN node. The underlying IP layer then re-writes the IP header so that the destination IP address points to the next CCN node. If the mapping relation does not exist, CCN router 108 maps the flow identifier to the HSVLI, updates its PIT, and forwards the interest fragment to the next CCN hop (e.g., CCN router 112). The same procedure occurs at each intermediate CCN router until the message fragment arrives at a node that can produce the content or whose cache contains the requested content (e.g., producer 114).

Content producer 114 can receive the interest fragments, pre-fragment the requested content object, add a fragment header to each of the fragment packets, and forward the content object fragments back along the reverse path of the interest. CCN router 112 can receive the fragments and forward the content object fragments by continuing to follow the reverse path of the interest (e.g., to CCN router 108 and on to requesting node 102). Requesting node 102 receives all the content object fragments and reassembles the content object.

Receiving and Forwarding Interest Fragment

Figure 2:
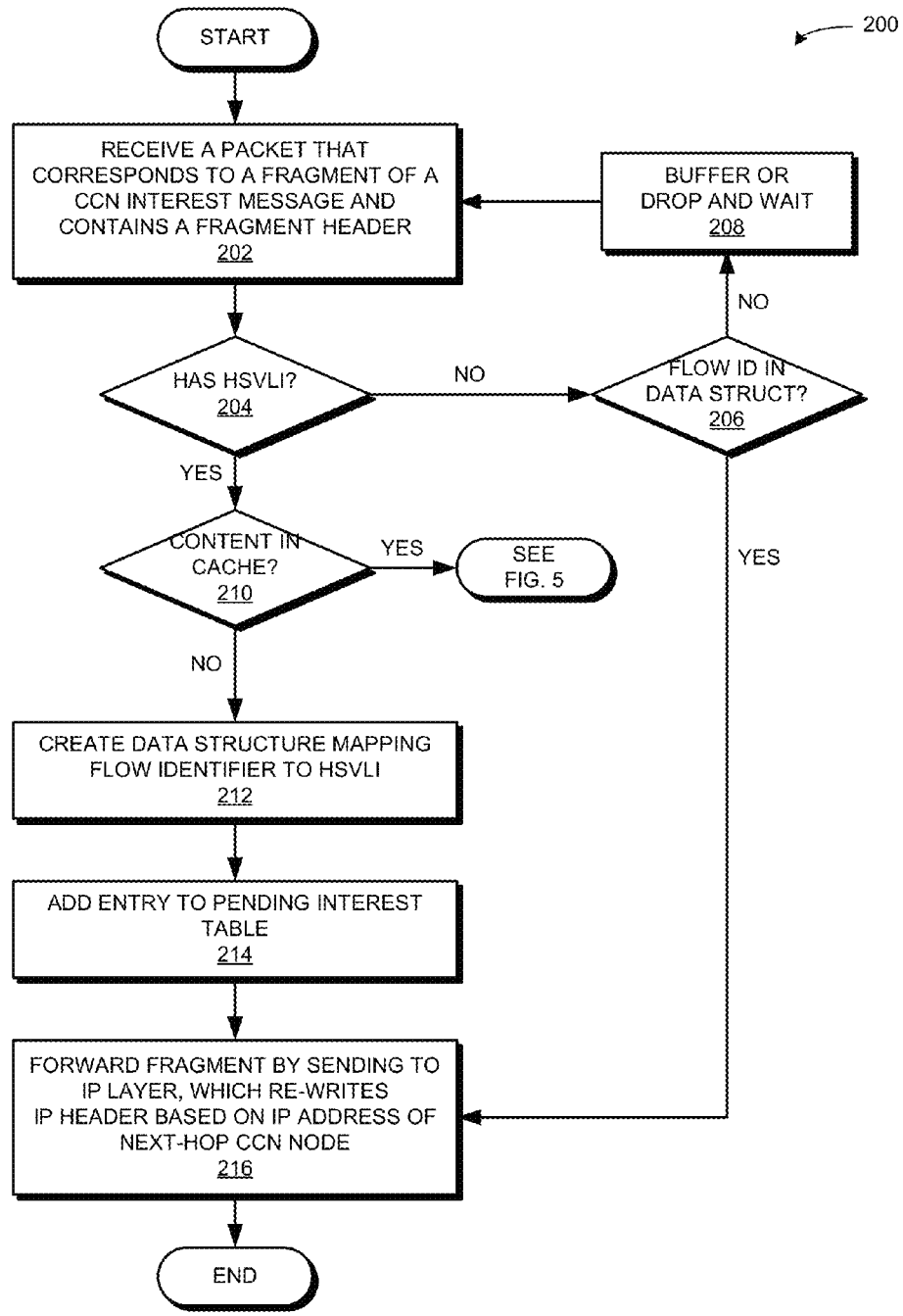
FIG. 2 presents a flow chart illustrating a method for receiving and forwarding a packet that indicates an interest in a piece of content, in accordance with an embodiment of the present invention.

FIG. 2 presents a flow chart 200 illustrating a method for receiving and forwarding a packet that indicates an interest in a piece of content, in accordance with an embodiment of the present invention. During operation, the system (for example, an intermediate CCN router) receives a packet that corresponds to a fragment of a CCN message and contains a fragment header (operation 202). If the packet contains sufficient information to identify the CCN interest (e.g., the content name, such as a hierarchically structured variable-length identifier (HSVLI)) (decision 204), the receiving node determines whether the content already exists in its cache (decision 210). If it does, the system proceeds to the operation depicted in FIG. 5. If the packet does not contain the unique identifier (e.g., the HSVLI), the system determines whether the flow identifier from the fragment header already exists in a local data structure (decision 206). If the flow identifier is not found in the local data structure, this indicates that the first fragment or fragments containing the unique identifying information for the interest has not yet arrived at the intermediate router. The intermediate router can buffer the fragment and continue to receive and buffer fragments until it receives the first fragment or fragments containing the identifying information (operation 208). Alternatively, the intermediate router can drop the packet, send a notification message to the originating CCN node, and wait until it receives the relevant fragment or fragments (operation 208).

If the flow identifier exists in the data structure (decision 206), a mapping relationship between the HSVLI and the flow identifier has already been created, indicating that the fragment (or fragments) containing the HSVLI has already been received by the intermediate router. In this case, the system performs cut-through forwarding of the interest message fragment by forwarding the fragment to the next hop in the CCN data path (operation 216) prior to receiving all fragment packets associated with the message. The intermediate CCN router forwards the fragment by sending the CCN fragment to the underlying IP layer, which rewrites the IP header based on the IP address of the next-hop CCN node.

If the received fragment does contain the HSVLI (decision 204) and the content does not reside in the cache of the intermediate router (decision 210), the intermediate router creates a data structure mapping the flow identifier from the fragment header to the HSVLI (operation 212). The intermediate router updates the Pending Interest Table (PIT) by adding an entry which corresponds to the interest (operation 214) and forwards the fragment by rewriting the outer IP header for the next hop in the CCN routing path (operation 216). In some embodiments, the PIT includes an interest fragment bitmap column which is updated each time a corresponding interest fragment is received by the intermediate router.

Receiving and Forwarding Content Object Fragment

Figure 3:
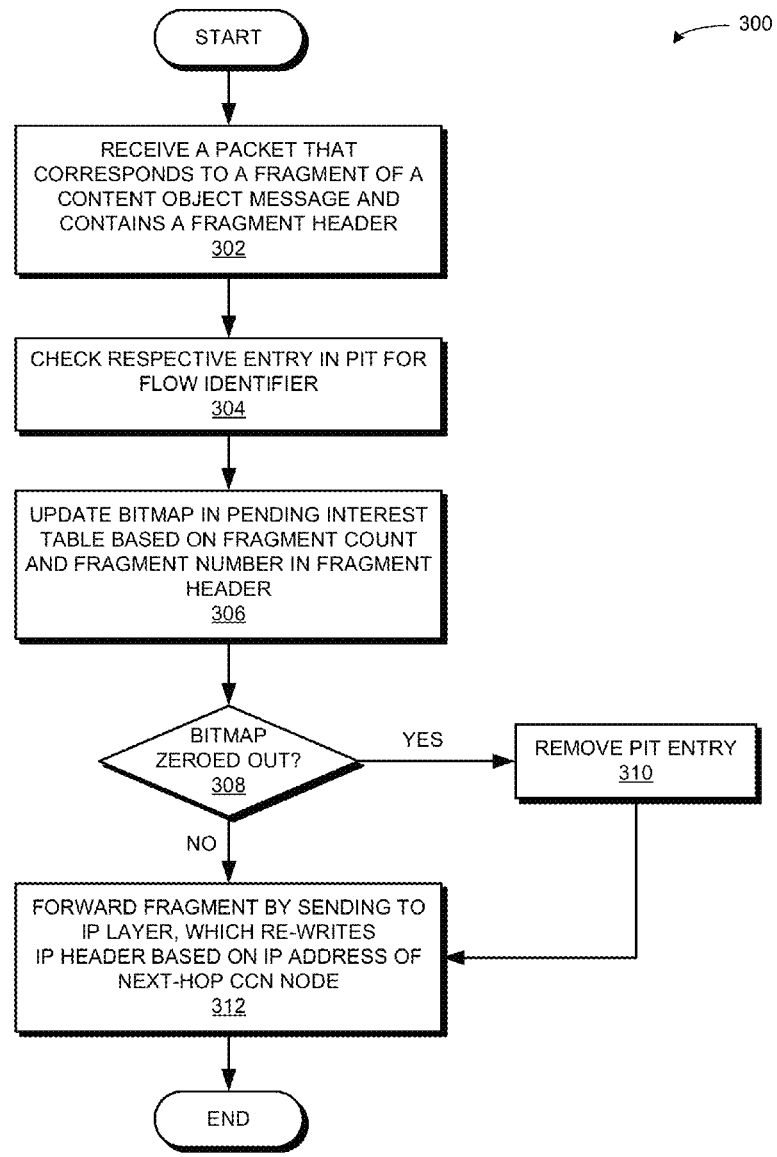
FIG. 3 presents a flow chart illustrating a method for receiving and forwarding a packet containing a content object message fragment, in accordance with an embodiment of the present invention.

FIG. 3 presents a flow chart 300 illustrating a method for receiving and forwarding a packet containing a content object, in accordance with an embodiment of the present invention. An intermediate CCN router receives a packet that corresponds to a fragment of a content object message and contains a fragment header (operation 302). The intermediate router checks the respective PIT entry based on the flow identifier included in the fragment header of the content object message fragment (operation 304). The intermediate router also updates a fragment bitmap column in the PIT (operation 306), which stores a bitmap (e.g., a 64-bit long bitmap) that indicates whether all of the fragments associated with the content object have been received. For example, based on the fragment count and the fragment index from the fragment header for a specific content object fragment, the intermediate router can update the appropriate bit in the bitmap with a "0" to indicate that the fragment has been received. Once all the bits in the fragment bitmap are "0", the bitmap column is "zeroed out" (decision 308), indicating that the intermediate router has received all of the fragments corresponding to the message based on the same flow identifier. The intermediate router removes the PIT entry (operation 310) to indicate that the pending interest has been fulfilled. Finally, the intermediate CCN router forwards the content object fragment by sending the CCN fragment to the underlying IP layer, which re-writes the IP header based on the IP address of the next-hop CCN node (operation 312).

Pre-Fragmenting Interest and Generating Fragment Header

Figure 4:
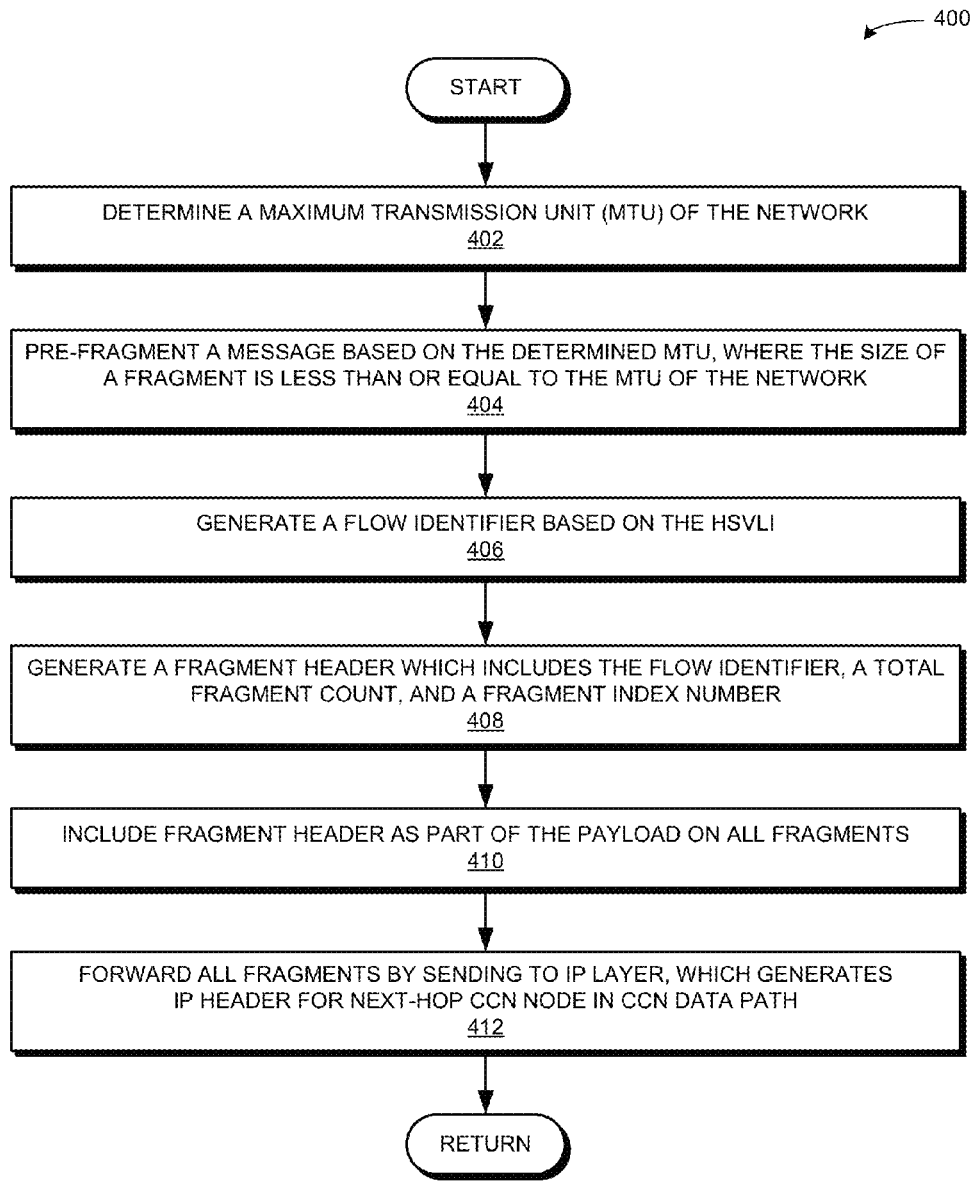
FIG. 4 presents a flow chart illustrating a method for pre-fragmenting an interest and generating a fragment header, in accordance with an embodiment of the present invention.

FIG. 4 presents a flow chart 400 illustrating a method for pre-fragmenting an interest and generating a fragment header, in accordance with an embodiment of the present invention. During operation, the system (e.g., a content requesting node) determines a maximum transmission unit (MTU) of the network (operation 402) and pre-fragments a message based on the determined MTU, such that the size of a fragment is less than or equal to the MTU of the network (operation 404). The requesting node generates a flow identifier based on the hierarchically structured variable-length identifier (HSVLI) (operation 406). The system generates a fragment header which includes the flow identifier, a total fragment count, and a fragment index number (operation 408) and includes the fragment header as part of the payload on all of the message fragments (operation 410). Finally, the requesting node sends the message fragments to the IP layer, which generates the IP header for the next-hop CCN node in the CCN data path (operation 412).

Pre-Fragmenting Content Object Message

Figure 5:
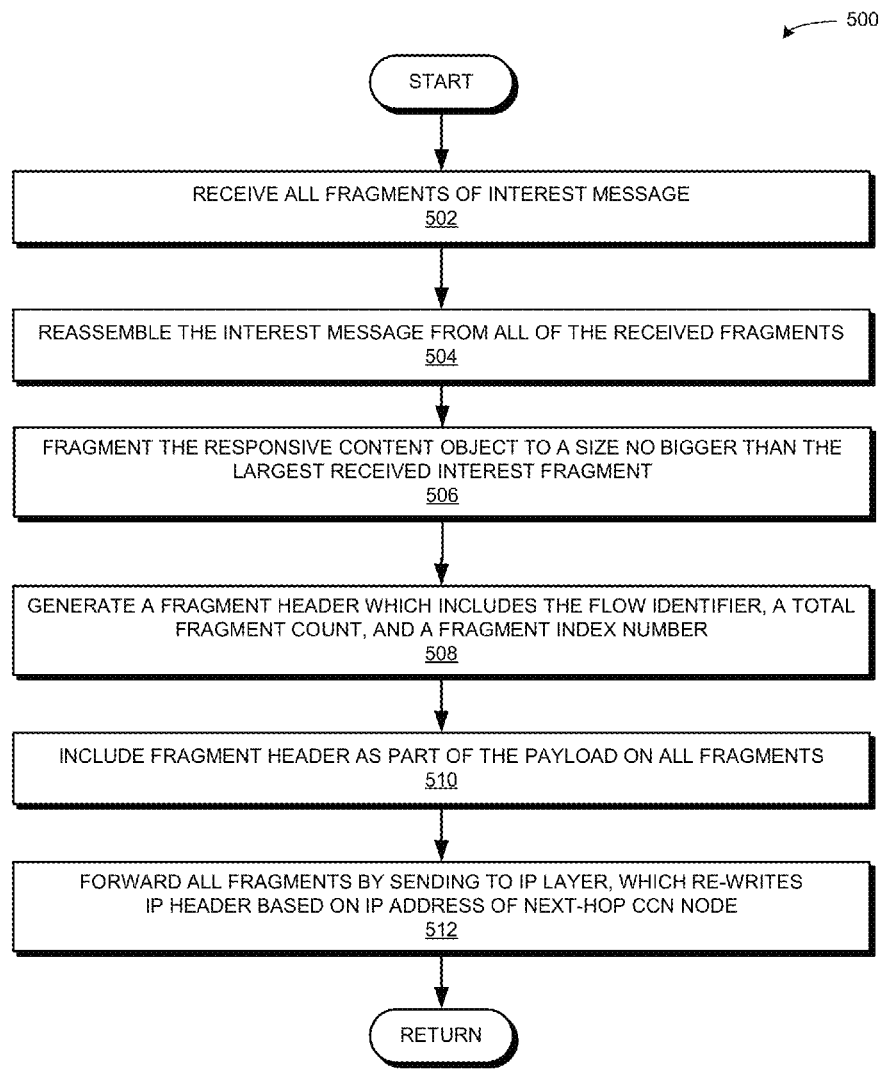
FIG. 5 presents a flow chart illustrating a method for fulfilling an interest in a piece of content by pre-fragmenting the content object, in accordance with an embodiment of the present invention.

FIG. 5 presents a flow chart 500 illustrating a method for fulfilling an interest in a piece of content by pre-fragmenting the content object, in accordance with an embodiment of the present invention. The system (e.g., a content producer node) receives all fragments of a CCN interest message (operation 502), and, upon determining that the content producer node can satisfy the interest, reassembles the interest message using the received fragments and the information contained in the fragment headers (e.g., total number of fragments and index number of each fragment) (operation 504). In response, the content producer node fragments the corresponding content object to a size no greater than the largest received interest fragment (operation 506). The content producer node generates a fragment header which includes the flow identifier, a total fragment count, and a fragment index number (operation 508) and includes the fragment header as part of the payload on all the content object fragments (operation 510). Finally, the content producer node forwards the content object fragments by sending the CCN fragments to the underlying IP layer, which re-writes the IP header based on the IP address of the next-hop CCN node (operation 512).

Exemplary Format of Message Fragments and Data Structure

Figure 6A:
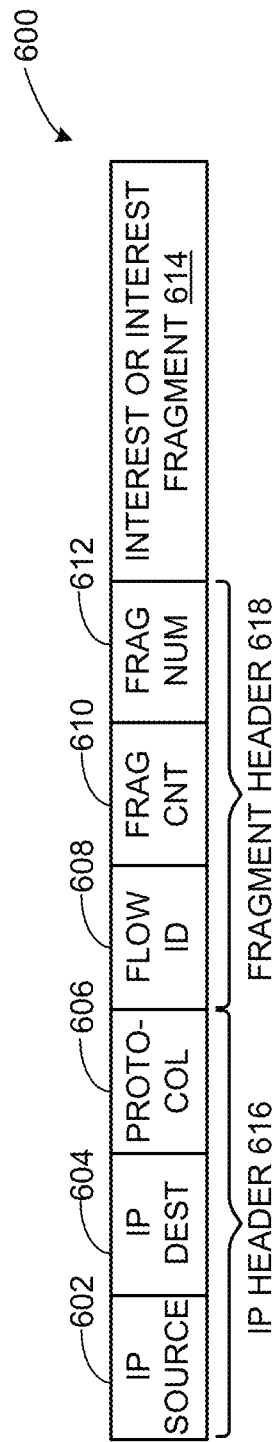
FIG. 6A illustrates an exemplary format for a CCN interest or interest fragment facilitating cut-through forwarding of message fragments over a network, in accordance with an embodiment of the present invention.

FIG. 6A illustrates an exemplary format for a CCN interest or interest fragment 600 facilitating cut-through forwarding of message fragments over a network, in accordance with an embodiment of the present invention. Fragment 600 includes an interest or interest fragment 614 and a fragment header 618. Fragment header 618 includes a flow identifier 608, a fragment count 610, and a fragment number 612. Interest or interest fragment 614 contains a portion of the CCN message, and fragment header 618 is included in each CCN fragment payload to identify the fragment as belonging to that CCN message. Flow identifier 608 is a number or common label that identifies the fragment as belonging to the CCN message. In some embodiments, flow identifier 608 can be a randomly generated 64-bit number. Flow identifier 608 can also be a hash-based value generated based on the HSVLI, a routable portion of the HSVLI, and/or other components of the CCN message, as described in U.S. patent application Ser. No. 14/067,587 and U.S. patent application Ser. No. 14/065,691. Fragment count 610 indicates the total number of fragments corresponding to the CCN message. Fragment number 612 indicates the index of the fragment within the stream. IP header 616 contains an IP source address 602, an IP destination address 604, and a protocol field 606. Other known IP header fields (not shown) can also be included in IP header 616. For example, in some embodiments, IP header 616 includes a control flag for the "Don't Fragment" (DF) sub-field that is set to "1" to indicate that the IP packet (which in this case carries pre-fragmented CCN message fragment 614 and fragment header 618 as the payload) should not be fragmented.

Figure 6B:
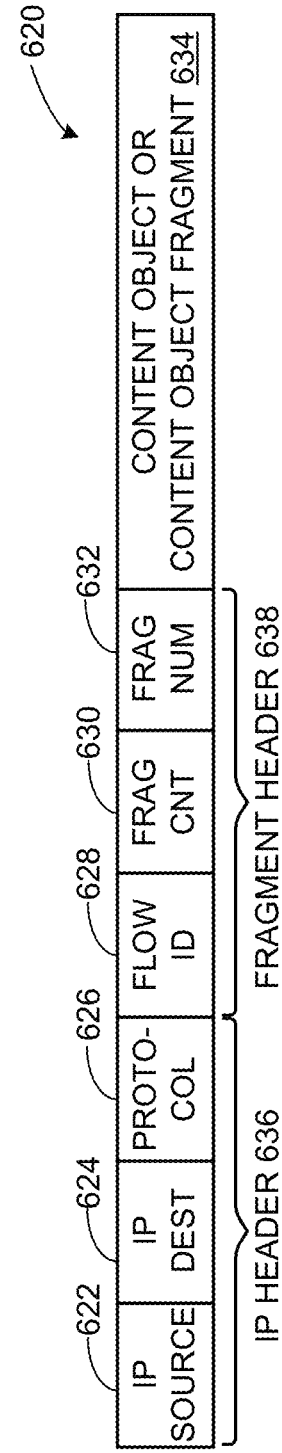
FIG. 6B illustrates an exemplary format for a CCN content object or content object fragment facilitating cut-through forwarding of message fragments over a network, in accordance with an embodiment of the present invention.

FIG. 6B illustrates an exemplary format for a CCN content object or content object fragment 620 facilitating cut-through forwarding of message fragments over a network, in accordance with an embodiment of the present invention. Content object or content object fragment 620 contains similar fields as interest or interest fragment 600 in FIG. 6A. Namely, fragment 620 includes a content object or content object fragment 634 and a fragment header 638. Fragment header 638 includes a flow identifier 628, a fragment count 630, and a fragment number 632. Note that the size and number of fragments associated with a content object may be different from the size and number of fragments received and contained in the corresponding interest message. For example, the size of the content object message fragments can be no larger than the largest received interest fragment. Furthermore, because the overall size of the content object in response to the received interest may be larger than the received interest, the number of fragments associated with a content object fragment stream may be greater than the number of fragments associated with the received interest stream. As with interest or interest fragment 600 in FIG. 6A, fragment 620 includes an IP header 636 which contains an IP source address 622, an IP destination address 624, and a protocol field 626.

Figure 7:
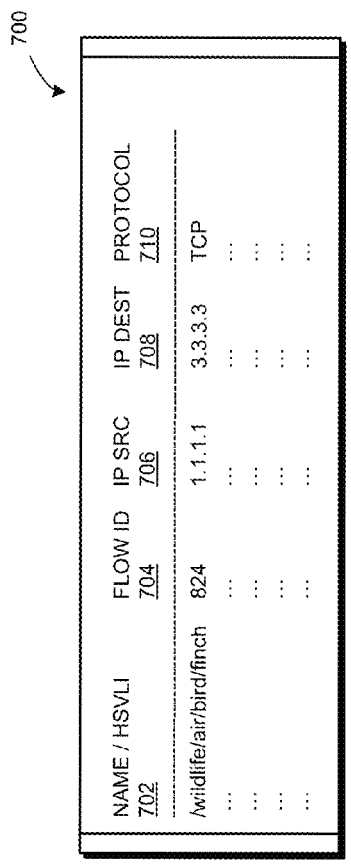
FIG. 7 illustrates an exemplary data structure maintained by the system to facilitate cut-through forwarding of message fragments over a network, in accordance with an embodiment of the present invention.

FIG. 7 illustrates an exemplary data structure 700 maintained by the system to facilitate cut-through forwarding of message fragments over a network, in accordance with an embodiment of the present invention. Data structure 700 includes a name field 702, which is depicted as a hierarchically structured variable-length identifier (HSVLI) but can include other formats as described herein. Data structure 700 can also include a flow identifier 704, as described in relation to the format for the fragment headers depicted in FIGS. 6A and 6B. Flow identifier 704 corresponds to HSVLI 702, such that message fragments that contain the same flow identifier correspond to the same CCN message. Data structure 700 can also include an IP source address 706 of the requesting node, an IP destination address 708 of the receiving node, and a protocol 710 used to transport the packet. In some embodiments, the higher-layer protocol used to transport the IP packet can be Transmission Control Protocol (TCP), User Datagram Protocol (UDP), or Generic Routing Encapsulation (GRE). In some embodiments, flow identifier 704, IP source address 706, IP destination address 708, and protocol field 710 together form a tuple from an IPv4 packet. This tuple comprises the Fragment Stream ID, which can be a 12-byte field. In some embodiments, the Fragment Stream ID can be used to maintain state in a PIT to indicate the path of a specific fragment stream. For example, one entry of data structure 700 can include an HSVLI of "/wildlife/air/bird/finch" with a flow identifier of 824, an IP source address of 1.1.1.1, an IP destination address of 3.3.3.3, and a protocol field indicating TCP.

Figure 8:
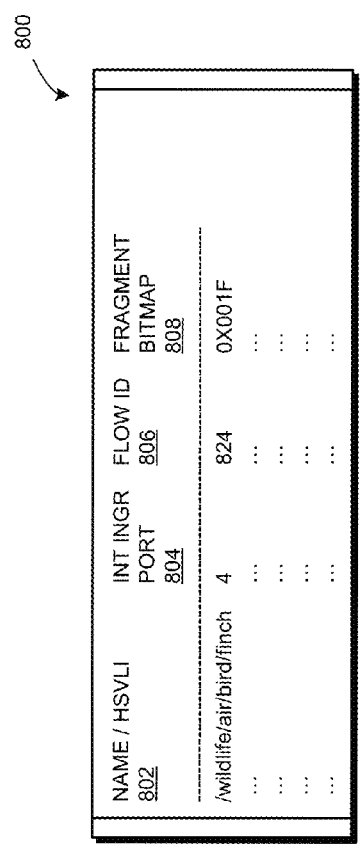
FIG. 8 illustrates an exemplary Pending Interest Table (PIT) maintained by the system to facilitate cut-through forwarding of message fragments over a network, in accordance with an embodiment of the present invention.

FIG. 8 illustrates an exemplary Pending Interest Table (PIT) 800 maintained by the system to facilitate cut-through forwarding of message fragments over a network, in accordance with an embodiment of the present invention. PIT 800 can include a name field 802, which is depicted as a hierarchically structured variable-length identifier (HSVLI) but can include other formats as described herein. PIT 800 can also include an interest ingress port field 804, which indicates the port that the interest arrived on and corresponds to the port over which a corresponding content object should be sent out. PIT 800 can also include a flow identifier field 806, as described in relation to the format for the fragment headers depicted in FIGS. 6A and 6B. Flow identifier field 806 corresponds to name field 802, such that message fragments that contain the same flow identifier correspond to the same CCN message. PIT 800 can also include a fragment bitmap column 808, which stores a bitmap (e.g., a 64-bit long bitmap) that indicates whether all of the content object message fragments have been received. In some embodiments, PIT 800 can include an interest fragment bitmap column (not shown), which stores a bitmap that indicates whether all of the interest message fragments have been received. The system can use this bitmap, in conjunction with a time to live (TTL) field or other time out or expiration field, to determine whether to remove an incomplete entry in PIT 800. The system can further use the interest fragment bitmap column for other purposes which are not enumerated herein.

Exemplary Computer and Communication System

Figure 9:
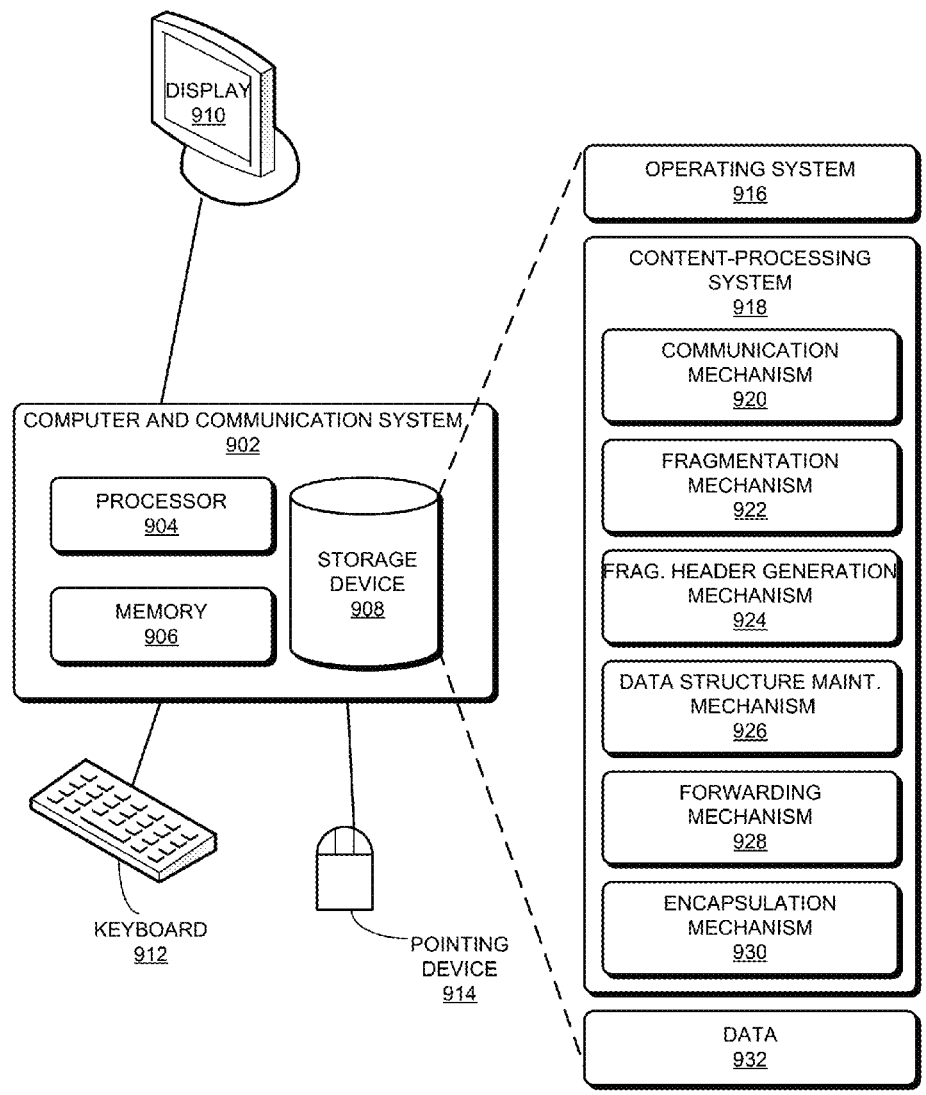
FIG. 9 illustrates an exemplary computer and communication system that facilitates cut-through forwarding of message fragments over a network, in accordance with an embodiment of the present invention.

FIG. 9 illustrates an exemplary computer and communication system 902 that facilitates cut through-forwarding of message fragments over a network. Computer and communication system 902 includes a processor 904, a memory 906, and a storage device 908. Memory 906 can include a volatile memory (e.g., RAM) that serves as a managed memory, and can be used to store one or more memory pools. Furthermore, computer and communication system 902 can be coupled to a display device 910, a keyboard 912, and a pointing device 914. Storage device 908 can store an operating system 916, a content-processing system 918, and data 932.

Content-processing system 918 can include instructions, which when executed by computer and communication system 902, can cause computer and communication system 902 to perform methods and/or processes described in this disclosure. Specifically, content-processing system 918 may include instructions for receiving a packet that corresponds to a fragment of a message and contains a fragment header (communication mechanism 920). Content-processing system 918 can also include instructions for making a forwarding decision for the packet based on the fragment header prior to receiving all fragments associated with the message (forwarding mechanism 928).

Content-processing system 918 can further include instructions for, in response to identifying a maximum transmission unit (MTU) of a network, fragmenting a message into one or more packets, where the size of each packet is less than or equal to the MTU of the network (fragmentation mechanism 922). Content-processing system 918 can also contain instructions for generating a fragment header which identifies the one or more packets as corresponding to the message (fragment header generation mechanism 924), and can further generate a flow identifier which corresponds to a hierarchically structured variable-length identifier (HSVLI) of the message (fragment header generation mechanism 924).

Content-processing system 918 can include instructions for storing in a data structure a mapping relationship between the fragment header and an HSVLI, where the HSVLI comprises contiguous name components ordered from a most general level to a most specific level (data structure maintenance mechanism 926). Content-processing system 918 can also include instructions for maintaining a pending interest table (PIT), where a respective PIT entry indicates a pending interest, a flow identifier, an HSVLI that identifies the interest and corresponds to the flow identifier, and a fragment bitmap column that indicates a number of corresponding content fragments that have been provided for the interest (data structure maintenance mechanism 926). Content-processing system 918 can further include instructions for encapsulating a packet using an outer Internet Protocol (IP) header to transmit the packet across a mixed network, where the mixed network is comprised of nodes associated with one or more of: a CCN; an IPv4 network; and an IPv6 network (encapsulation mechanism 930).

Data 932 can include any data that is required as input or that is generated as output by the methods and/or processes described in this disclosure. Specifically, data 932 can store at least: a packet that corresponds to a fragment of a message and contains a fragment header; a fragment header; a flow identifier that indicates that the fragment corresponds to a message; a fragment count that indicates a total number of fragments which correspond to a message; a fragment number that indicates the index of the fragment in the stream; a fragment stream identifier which corresponds to a tuple comprised of an IP source address, an IP destination address, a protocol field that indicates a higher-layer protocol carried in an IP packet, and a flow identifier that indicates that the fragment corresponds to a message; a hierarchically structured variable-length identifier (HSVLI) comprising contiguous name components ordered from a most general level to a most specific level; a data structure containing a mapping relationship between a fragment header and an HSVLI; a pending interest table (PIT); a fragment bitmap that indicates a number of corresponding content fragments that have been provided for an interest; a fragment bitmap that indicates a number of corresponding interest fragments that have been received by an intermediate node; and an IP header sufficient to encapsulate an IP packet and transmit the packet across a mixed network comprised of CCN, IPv4, and/or IPv6 nodes.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for forwarding packets, the method comprising:
    determining, by a content-requesting node, a maximum transmission unit of a network;
    fragmenting, by the content-requesting node, a message into one or more packets, wherein the size of each packet is less than or equal to the maximum transmission unit of the network;
    generating, by the content-requesting node, a flow identifier which indicates that a respective packet corresponds to the message, wherein the flow identifier corresponds to an identifier of the message,
    wherein the identifier of the message is a hierarchically structured variable length identifier which comprises contiguous name components ordered from a most general level to a most specific level;
    generating, by the content-requesting node, a fragment header which identifies the one or more packets as corresponding to the message, wherein the fragment header includes:
        the flow identifier;
        a fragment count that indicates a total number of fragments which correspond to the message; and
        a fragment number that indicates an index of the fragment;
    receiving, by a computing device, a first packet that corresponds to a fragment of the message and contains the fragment header;
    storing, by the computing device, in a data structure a mapping relationship between the fragment header and the identifier of the message; and
    making, by the computing device, a forwarding decision for the first packet based on the fragment header prior to receiving all fragment packets associated with the message,
    thereby facilitating cut-through forwarding of the message fragments over a network.

2. The method of claim 1, wherein the data structure further comprises a fragment stream identifier which corresponds to a tuple including:
    an Internet Protocol (IP) source address;
    an IP destination address;
    a protocol field that indicates a higher-layer protocol carried in an IP packet; and
    a flow identifier that indicates that the fragment corresponds to the message.

3. The method of claim 1, further comprising maintaining a pending interest table, wherein a respective entry in the pending interest table indicates a pending interest, the flow identifier, a hierarchically structured variable-length identifier that identifies the interest and corresponds to the flow identifier, and a fragment bitmap that indicates a number of corresponding content fragments that have been provided for the interest, wherein the identifier that identifies the interest is a hierarchically structured variable length identifier which comprises contiguous name components ordered from a most general level to a most specific level.

4. The method of claim 1, further comprising:
    encapsulating the packet using an outer Internet Protocol (IP) header to transmit the packet across a mixed network, wherein the mixed network is comprised of nodes associated with one or more of:
        a content centric network;
        a network running a version four of IP; and
        a network running a version six of IP;
    thereby facilitating cut-through forwarding of the message fragments using IP encapsulation over the network.

5. The method of claim 1, wherein the packet contains a content object in response to an interest in the content, and wherein the size of the packet containing the content object is equal in size to or smaller than a largest fragment corresponding to an interest in the content, based on a same flow identifier in the fragment header.

6. The method of claim 3, further comprising:
    adding an entry in the pending interest table, wherein the entry corresponds to the message;
    in response to receiving the first packet, updating the fragment bitmap in the entry based on the fragment count and the fragment number of the fragment header; and
    in response to determining that the fragment bitmap is zeroed out, removing the entry from the pending interest table.

7. A computer system for facilitating forwarding of packets, the system comprising:
    a processor; and
    a storage device storing instructions that when executed by the processor cause the processor to perform a method, the method comprising:
        determining, by a content-requesting node, a maximum transmission unit of a network;
        fragmenting, by the content-requesting node, a message into one or more packets, wherein the size of each packet is less than or equal to the maximum transmission unit of the network;
        generating, by the content-requesting node, a flow identifier which indicates that a respective packet corresponds to the message, wherein the flow identifier corresponds to an identifier of the message;
        wherein the identifier of the message is a hierarchically structured variable length identifier which comprises contiguous name components ordered from a most general level to a most specific level;

generating, by the content-requesting node, a fragment header which identifies the one or more packets as corresponding to the message, wherein the fragment header includes:
  the flow identifier;
  a fragment count that indicates a total number of fragments which correspond to the message; and
  a fragment number that indicates an index of the fragment;
receiving, by a computing device, a first packet that corresponds to a fragment of the message and contains the fragment header;
storing, by the computing device, in a data structure a mapping relationship between the fragment header and the identifier of the message; and
making, by the computing device, a forwarding decision for the first packet based on the fragment header prior to receiving all fragment packets associated with the message,
thereby facilitating cut-through forwarding of the message fragments over a network.

8. The computer system of claim 7, wherein the data structure further comprises a fragment stream identifier which corresponds to a tuple including:
  an Internet Protocol (IP) source address;
  an IP destination address;
  a protocol field that indicates a higher-layer protocol carried in an IP packet; and
  a flow identifier that indicates that the fragment corresponds to the message.

9. The computer system of claim 7, wherein the method further comprises maintaining a pending interest table, wherein a respective entry in the pending interest table indicates a pending interest, the flow identifier, a hierarchically structured variable-length identifier that identifies the interest and corresponds to the flow identifier, and a fragment bitmap that indicates a number of corresponding content fragments that have been provided for the interest, wherein the identifier that identifies the interest is a hierarchically structured variable length identifier which comprises contiguous name components ordered from a most general level to a most specific level.

10. The computer system of claim 7, wherein the method further comprises:
  encapsulating the packet using an outer Internet Protocol (IP) header to transmit the packet across a mixed network, wherein the mixed network is comprised of nodes associated with one or more of:
    a content centric network;
    a network running a version four of IP; and
    a network running a version six of IP;
  thereby facilitating cut-through forwarding of the message fragments using IP encapsulation over the network.

11. The computer system of claim 7, wherein the packet contains a content object in response to an interest in the content, and wherein the size of the packet containing the content object is equal in size to or smaller than a largest fragment corresponding to an interest in the content, based on a same flow identifier in the fragment header.

12. The computer system of claim 9, wherein the method further comprises:
  adding an entry in the pending interest table, wherein the entry corresponds to the message;
  in response to receiving the first packet, updating the fragment bitmap in the entry based on the fragment count and the fragment number of the fragment header; and
  in response to determining that the fragment bitmap is zeroed out, removing the entry from the pending interest table.

13. A non-transitory computer-readable storage medium storing instructions that when executed by a computer cause the computer to perform a method, the method comprising:
  determining, by a content-requesting node, a maximum transmission unit of a network;
  fragmenting, by the content-requesting node, a message into one or more packets, wherein the size of each packet is less than or equal to the maximum transmission unit of the network;
  generating, by the content-requesting node, a flow identifier which indicates that a respective packet corresponds to the message, wherein the flow identifier corresponds to an identifier of the message,
  wherein the identifier of the message is a hierarchically structured variable length identifier which comprises contiguous name components ordered from a most general level to a most specific level;
  generating, by the content-requesting node, a fragment header which identifies the one or more packets as corresponding to the message, wherein the fragment header includes:
    the flow identifier;
    a fragment count that indicates a total number of fragments which correspond to the message; and
    a fragment number that indicates an index of the fragment;
  receiving, by a computing device, a first packet that corresponds to a fragment of the message and contains the fragment header;
  storing, by the computing device, in a data structure a mapping relationship between the fragment header and the identifier of the message; and
  making, by the computing device, a forwarding decision for the packet based on the fragment header prior to receiving all fragment packets associated with the message,
  thereby facilitating cut-through forwarding of the message fragments over a network.

14. The storage medium of claim 13, wherein the data structure further comprises a fragment stream identifier which corresponds to a tuple including:
  an Internet Protocol (IP) source address;
  an IP destination address;
  a protocol field that indicates a higher-layer protocol carried in an IP packet; and
  a flow identifier that indicates that the fragment corresponds to the message.

15. The storage medium of claim 13, wherein the method further comprises maintaining a pending interest table, wherein a respective entry in the pending interest table indicates a pending interest, the flow identifier, a hierarchically structured variable-length identifier that identifies the interest and corresponds to the flow identifier, and a fragment bitmap that indicates a number of corresponding content fragments that have been provided for the interest, wherein the identifier that identifies the interest is a hierarchically structured variable length identifier which comprises contiguous name components ordered from a most general level to a most specific level.

16. The storage medium of claim 13, wherein the method further comprises:
 encapsulating the packet using an outer Internet Protocol (IP) header to transmit the packet across a mixed network, wherein the mixed network is comprised of nodes associated with one or more of:
 a content centric network;
 a network running a version four of IP; and
 a network running a version six of IP;
 thereby facilitating cut-through forwarding of the message fragments using IP encapsulation over the network.

17. The storage medium of claim 13, wherein the packet contains a content object in response to an interest in the content, and wherein the size of the packet containing the content object is equal in size to or smaller than a largest fragment corresponding to an interest in the content, based on a same flow identifier in the fragment header.

18. The storage medium of claim 15, wherein the method further comprises:
 adding an entry in the pending interest table, wherein the entry corresponds to the message;
 in response to receiving the first packet, updating the fragment bitmap in the entry based on the fragment count and the fragment number of the fragment header; and
 in response to determining that the fragment bitmap is zeroed out, removing the entry from the pending interest table.

\* \* \* \* \*